March 7, 1967 H. DICKINSON ET AL 3,307,575
PILOT OPERATED VACUUM AND PRESSURE RELIEF VALVE
Original Filed May 29, 1963
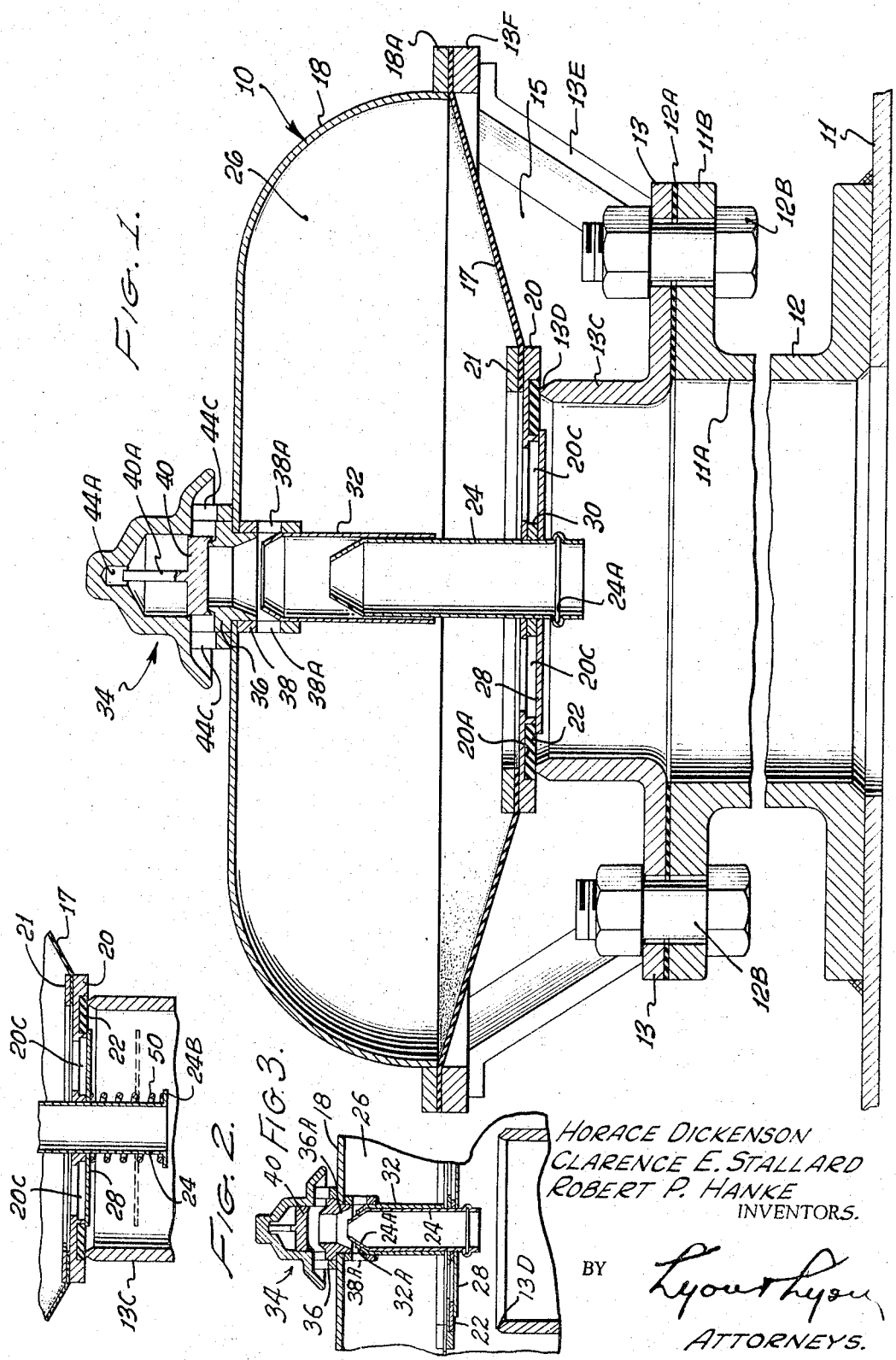
HORACE DICKENSON
CLARENCE E. STALLARD
ROBERT P. HANKE
INVENTORS.
BY
ATTORNEYS.

United States Patent Office 3,307,575
Patented Mar. 7, 1967

3,307,575
PILOT OPERATED VACUUM AND PRESSURE
RELIEF VALVE
Horace Dickinson, South Gate, Clarence E. Stallard, Lakewood, and Robert P. Hanke, Whittier, Calif., assignors to Varec, Inc., Compton, Calif., a corporation of California
Continuation of application Ser. No. 284,061, May 29, 1963. This application Sept. 23, 1964, Ser. No. 400,632
14 Claims. (Cl. 308—55)

The present invention relates to improvements in valves which are particularly useful as breather valves that operate automatically to vent an enclosure or storage vessel when the pressure therein is either above or below atmospheric pressure.

The present application is a continuation of our application Serial No. 284,061, filed May 29, 1963, now abandoned.

One important feature of the present construction is that it incorporates a single port for both pressure and vacuum relief. Another important feature is that a movable valve element is held tightly against its seat until a predetermined or preset pressure is reached thereby preventing likelihood of increasing leakage prior to attainment of such preset pressure. Another important feature is that the valve "fails safe" when there is failure of a diaphragm member. Another important feature is that the movable valve element operates to achieve improved overall operation, reduction in leakage and improved flow characteristics.

It is therefore an object of the present invention to provide a valve structure having desirable features indicated above.

A specific object of the present invention is to provide a valve construction of this character having a single port controlled by a diaphragm with a pilot valve controlling the operation of the diaphragm.

Another specific object of the present invention is to provide a valve construction of this character in which telescoping tubes serve a dual function in guiding movement of a diaphragm and in communicating pressure from the enclosure to a chamber defined in part by an extended surface area of the diaphragm, with the pressure in such chamber being controlled by a pilot valve arranged to operate a present pressure in such chamber.

Another specific object of the present invention is to provide a valve structure of this character in which a flow of gas is directed to the movable pilot valve element when opened to maintain it open to prevent an oscillatory condition of such valve element during the time that pressures are being equalized.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings, in which:

FIG. 1 is generally a transverse sectional view through a valve structure embodying features of the present invention.

FIG. 2 is also generally a transverse sectional view of a portion of the valve structure shown in FIG. 1 and illustrates the manner in which the same is modified, also in accordance with the present invention.

FIG. 3 shows elements of FIG. 1 in a different operating position.

In FIG. 1, the valve structure 10 for purposes of illustration is shown mounted on a storage vessel 11 having an opening 11A defined by a flanged pipe section 12 which has its lower flanged portion welded to the vessel and its upper flanged portion mounting the valve structure 10 using a sealing gasket 12A and bolts 12B for sealingly clamping the valve plate 13 to pipe section 12. The plate 13 is formed to provide a central cylinder portion 13C which terminates in an annular raised valve seat 13D and has secured thereto an open support in the form of a series of spaced rib members 13E for a ring 13F which may be integrally formed with the rib members 13E.

A flexible diaphragm 17 has its outer peripheral portion clamped between the ring 13F and ring 18A of an upper annular casing member 18 and has its inner annular marginal edge portion clamped between a ring-shaped member 21 and a modified disc-shaped member 20.

The lower member 20 is provided with an annular grooved portion 20A within which a washer or ring 22 of relatively soft elastic material is secured for sealing engagement with the raised valve seat 13D. The lower member 20 is provided with a central apertured portion 20B through which a centering tube 24 extends and to which such tube 24 is secured. Also, this member 20 is provided with a plurality of apertured portions 20C for communicating, under certain conditions described later, the interior of vessel 11 with the upper chamber 26 which is defined in part by the upper casing 18 and the top side of diaphragm 17.

A valve plate 28 of magnetizable material and in the form of an apertured disc is slidably mounted on the lower end of tube 24 and is releasably retained against the lower surface of member 20 to normally prevent communication through such apertured portions 20C by a ring-shaped magnet 30 secured to such member 20.

The upper end of tube 24 is slidably, i.e., telescopically, received in the lower portion of a tube 32 which is stationarily mounted in accordance with the following description:

A pressure responsive pilot valve 34 is mounted on an apertured portion of casing member 18. This valve 34 includes a valve seat 36 having a shouldered portion engaging the outer surface of casing member 18 with a cylindrical portion extending into chamber 26, and having secured thereto a collar 38 as, for example, by mating screw threads to firmly secure the valve seat to casing member 18 without leakage. This collar 38 has its lower end secured to the upper end of tube 32 and is provided with a plurality of apertured portions 38A to allow communication between the interior of vessel 11 and chamber 26 via the telescoping diaphragm guide tubes 24 and 32.

A weighted and gravity actuated movable valve member 40 cooperates in sealing relationship with the raised annular portion of valve seat 36 and is guided in its movement by its stem 40A sliding in a blind bore 44A in the valve housing 44 which is provided with a plurality of apertured portions 44C and is secured to the valve seat 36 as, for example, by screw threads. Thus, under conditions discussed below, when the valve element 40 is raised from its seat 36, the chamber 26 is vented to the atmosphere.

In the operation of the arrangement, when the pressure inside vessel 11 is the same as the ambient atmospheric pressure, the parts are in positions shown in FIG. 1. In such condition, the valve apertures 20C are closed by plate 28 which is retained by magnet 30 and both chambers 26 and 15 are at atmospheric pressure.

When the pressure in vessel 11 is somewhat above atmospheric pressure but below a preset pressure established by the weighted valve member 40, the valve 40, 36 remains closed, and now the pressure in chamber 26 is higher than the atmospheric pressure in chamber 15. Since this static pressure in chamber 26 is the tank pressure and acts on an effective area corresponding to the entire projected area of the diaphragm 17, a large downward force is produced which is greater than the combined upward forces produced by the atmospheric pressure acting upwardly on diaphragm 17 in chamber 15 and the tank pressure acting upwardly on the underside of assembly 20, 21 and 22. Consequently, such assembly 20, 21, 22 referred to as a pallet is pressed by the resultant downward force tightly against its valve seat 13D. This resultant force becomes larger and larger as the pressure in the vessel increases until a set pressure in the vessel is reached where the weighted valve element 40 is lifted from its seat 36.

When this latter condition is reached, the chamber 26 is then vented to the atmosphere via openings 38A and 44C, and the pressure acting on the underside of assembly 20, 21, 22 now causes the valve 22, 13D to open thereby intercommunicating the interior of vessel 11 to the atmosphere via chamber 15 and thus relieving the pressure in vessel 11. In such opening movement of valve 22, 13D, the diaphragm is guided in its movement by tube 24 sliding in stationary tube 32, which tubes also serve to some extent to relieve this excess pressure in vessel 11 with the gas or fluid flowing to atmosphere via valve 40, 36.

When the static pressure in vessel 11 falls sufficiently to a particular subatmospheric pressure, the prevailing atmospheric pressure in chamber 15 which is greater than the pressure in chamber 26 causes the diaphragm 17 to raise, thereby raising valve element 22 from its seat 13D to allow atmospheric air to enter the vessel 11 and raise its pressure to substantially atmospheric pressure. In achieving this condition, the pilot valve 40, 36 remains closed.

Should there be a leak in diaphragm 17 at the time it is supposed to operate to relieve subatmospheric conditions in vessel 11, the pressure then builds up in chamber 26 via this assumed leak until it is sufficient to cause the auxiliary valve element 28 to move from its normal magnetically attracted position, thereby uncovering the apertured portions 20C to thereby provide a relatively unrestricted flow passage from chamber 26 to the vessel. In order to prevent the valve element from sliding off of tube 24, it may be provided with a stop such as, for example, a raised bead 24A thereon.

Instead of the valve element 28 being normally held in its closed position by a magnet 30 as in FIG. 1, the same may be retained in such normal position by a spring, as illustrated in FIG. 2, wherein such spring 50, a coil compression spring, has one of its ends bearing against a flanged end portion 24B of tube 24 and the other one of its ends bearing against the plate valve element 28 to normally close the apertured portions 20C.

It will be seen that the upper ends of tubes 24 and 32 are each provided with an upper conical end portion 24A, 32A, respectively, that defines a nozzle for the purpose of developing a velocity head when the valve 40, 36 is opened with the conical portion 32A of tube 32 being adjacent to openings 38A and below the conical portions 36A of valve seat 36 to develop an aspirating effect on the gas in chamber 26 and influence the exhaust of gas from chamber 26. The resulting upward jet of gas impinging on the weighted valve member 40 assures its maintenance in an open position and thus prevents any tendency for such valve mmeber 40 to alternately open and close, i.e., to prevent oscillation or so-called "hunting" of valve member 40.

It will be seen that whenever the static tank pressure produces a force on the weighted valve member 40 sufficient to lift it from its seat 40, gas flow occurs from the tank 11 via the tubes 24, 32 and through valve seat 36 to the atmosphere. The gas flow in producing the above mentioned aspirating effect flows through the inwardly directed conical tube ends 24A and 32A each in the form of a nozzle to also direct the stream of gas upwardly against the valve member 40 to produce a force thereon which acts against gravity forces thereon to prevent closing of the valve 40, 36, as described previously. This aspirating effect in its initial stages, when pallet 20, 21, 22 is still on its seat 13D, is due to the venturi section defined generally by the adjacent conical end portions 32A, 36A, with the openings 38A forming generally a pilot communication to the venturi section. The pressure difference which manifests itself as a reduction of pressure due to increase of gas velocity in the venturi section accelerates gas and produces an aspirating effect causing gas to be exhausted from chamber 26 via openings 38A and valve 40, 36. When the pressure in chamber 26 is thus reduced sufficiently, the pallet assembly 20, 21, 22 lifts from its seat 13 for full flow carrying with it the tube 24 so that ultimately in the fully opened position of the pallet the conditions shown in FIG. 3 exist, with the venturi section and aspirating action being changed as a result of the tube end 24A entering into tube end 32A to increase the aspirating effect. Indeed, this aspirating effect is increased during upward movement of tube 24 and is a maximum in the condition shown in FIG. 3.

The pilot valve 40, 36 closes before the main valve element 20, 21, 22 reseats with the flow of gas from the tank past the seat 13D maintaining this main valve element in a raised condition in discharging tank overpressure.

This arrangement thus provides sufficient depressurization or "blow down" of the tank so that when the pallet 20, 21, 22 ultimately reseats on its seat 13D, it remains seated without movement therefrom until the tank pressure again reaches a value sufficient to cause the pilot valve 40 to be raised from its seat and repeat the cycle of operations described above involving a conversion of static pressure into a velocity head that induces a flow through the venturi section to cause the main valve to be raised from its seat 13D to its fully open position within a short time interval following attainment of a pressure established by the weight of valve element 40.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

We claim:

1. A pressure operated valve structure of the character described; two part casing means; a diaphragm having its peripheral edge portion mounted between the two parts of said casing means; a raised valve seat stationarily mounted with respect to said casing means; a valve member mounted on said diaphragm and cooperating with said valve seat; the exterior of said raised valve seats and one part of said casing means and one side portion of said diaphragm forming a part of a first chamber; said diaphragm having a portion of its other side forming a part of a second chamber with said valve member and the other part of said casing means; said first chamber being vented to a region outside of said casing means; check valve means on said other part of said casing means and operative upon establishment of pressure in said second chamber to open and vent said second chamber to said region; said valve member having a passageway therethrough communicating the interior of the valve seat with said second chamber, said passageway being directed to produce a gas flow against said check valve to develop a force thereon acting in a direction to open said check valve, said valve member having a second passageway therethrough, means normally closing said second passageway, the last-mentioned means being operated to open said second passageway in response to differences in pressure between said second chamber and the interior of said valve seat.

2. A valve structure as set forth in claim 1 in which said last mentioned means includes a plate normally maintained in a magnetically attracted position on said valve member to close said second passageway.

3. A valve structure as set forth in claim 1 in which said last mentioned means includes a plate spring urged against said valve member to close said second passageway.

4. In a pressure activated valve structure of the character described, a diaphragm, a valve seat, a valve member on said diaphragm and cooperating with said valve seat, means including one side of said diaphragm and defining a first chamber, means including the other side of said diaphragm and one side of said valve member and defining a second chamber, means including the other side of said valve member and said seat and defining a third chamber, said first chamber being vented to the atmosphere, pressure operated pilot valve means normally closed to prevent communication of said second chamber with the atmosphere and operated to an open position in response to above atmosphere conditions in said second chamber to vent said second chamber to the atmosphere, and a passageway through said valve member communicating said third chamber with said second chamber, said passageway being directed to produce a gas flow against said pilot valve means to develop a force thereon acting in a direction to open said pilot valve means said valve member carrying valve means which is normally closed and which is opened in response to a greater pressure in said second chamber than in said third chamber to intercommunicate said second and third chambers.

5. A valve structure as set forth in claim 4 in which said passageway includes first conduit means on said valve member, second conduit means in communication with the first conduit and slidably mounted with respect thereto for guiding movement for said diaphragm.

6. A valve structure as set forth in claim 5 in which said second conduit means includes nozzle means for directing a stream against said pilot valve means when opened to assure maintenance of said check valve means in its open position.

7. A valve structure as set forth in claim 4 in which said pilot valve means comprises a weighted valve element normally maintained by gravity on a valve seat.

8. A pressure operated valve structure of the character described; two part casing means; a diaphragm having its peripheral edge portion mounted between the two parts of said casing means; a raised valve seat stationarily mounted with respect to said casing means; a valve member mounted on said diaphragm and cooperating with said valve seat; the exterior of said raised valve seats and one part of said casing means and one side portion of said diaphragm forming a part of a first chamber; said diaphragm having a portion of its other side forming a part of a second chamber with said valve member and the other part of said casing means; said first chamber being vented to a region outside of said casing means; check valve means on said other part of said casing means and operative upon establishment of pressure in said second chamber to open and vent said second chamber to said region; said valve member having a passageway therethrough communicating the interior of the valve seat with said second chamber, said passageway being directed to produce a gas flow against said check valve to develop a force thereon acting in a direction to open said check valve, said check valve means communicating with first conduit means having an aperture portion communicating said second chamber with the interior of said conduit means, second conduit means extending into said first conduit means and terminating in a nozzle which terminates adjacent said apertured portion and which is directed to produce a stream of gas against said check valve means when said check valve means is open to assure maintenance of said check valve means in its open position, third conduit means carried by said valve member, said third conduit means being slidably mounted with respect to said second conduit means and communicating said first passageway with said second conduit means.

9. In a pressure activated valve structure of the character described, a diaphragm, a valve seat, a valve member on said diaphragm and cooperating with said valve seat, means including one side of said diaphragm and defining a first chamber, means including the other side of said diaphragm and one side of said valve member and defining a second chamber, means including the other side of said valve member and said seat and defining a third chamber, said first chamber being vented to the atmosphere, pressure operated pilot valve means normally closed to prevent communication of said second chamber with the atmosphere and operated to an open position in response to above atmoshpere conditions in said second chamber to vent said second chamber to the atmosphere, and a passageway through said valve member communicating said third chamber with said second chamber, said passageway being directed to produce a gas flow against said pilot valve means to develop a force thereon acting in a direction to open said pilot valve means, said passageway including first conduit means on said valve member, second conduit means in communication with the first conduit and slidably mounted with respect thereto for guiding movement for said diaphragm, said second conduit means including nozzle means for directing a stream against said pilot valve means when opened to assure maintenance of said check valve means in its open position, and an apertured portion in said second conduit means adjacent said nozzle means and communicating said second chamber with said second conduit means.

10. In a pressure relief system of the character described wherein a pallet assembly is positioned with respect to a valve seat in accordance with pressure conditions on opposite sides of a diaphragm supporting said assembly, and with one of said sides being subjected to atmospheric pressure and with the other one of said sides together with one side of said assembly defining a chamber, and with the other side of said assembly being subjected to a tank pressure, the improvement which resides in providing: pilot means for closing said chamber; conduit means extending through said assembly and communicating said tank pressure to said chamber; said pilot valve means being pressure responsive and set to open at a preset pressure in aid chamber insufficient to move said assembly from its seat; and said conduit means being directed to produce a stream against said pilot valve means to tend to maintain said pilot valve means open once it is opened by said preset pressure, said conduit means being provided with means for inducing a flow of gas from said chamber to said pilot valve means when said pilot valve means is opened by said preset pressure, said conduit means including a Venturi section being altered in accordance with movement of said assembly.

11. In a pressure activated valve structure of the character described, a diaphragm, a valve seat, valve means on said diaphragm and cooperating with said valve seat, means including one side of said diaphragm and defining a first chamber, means including the other side of said diaphragm and one side of said valve means and defining a second chamber, means including the other side of said valve means and said seat and defining a third chamber, said first chamber being vented to the atmosphere, a passageway through said valve member communicating said third chamber with said second chamber, said valve means carrying a pressure responsive valve which is normally closed and which is automatically opened when the pressure in said second chamber exceeds the pressure in said third chamber to intercommunicate said second and third chambers.

12. A pressure operated valve structure of the character described; two part casing means; a diaphragm having its peripheral edge portion mounted between the two parts of said casing means; a raised valve seat stationarily mounted with respect to said casing means; a valve member mounted on said diaphragm and cooperating with said valve seat; the exterior of said raised valve seats and one part of said casing means and one side portion of said diaphragm forming a part of a first chamber; said diaphragm having a portion of its other side forming a part of a second chamber with said valve member and the other part of said casing means; said first chamber being vented to a region outside of said casing means; check valve means on said other part of said casing means and operative upon establishment of pressure in said second chamber to open and vent said second chamber to said region; said valve member having a passageway therethrough communicating the interior of the valve seat with said second chamber, said passageway being directed to produce a gas flow against said check valve to develop a force thereon acting in a direction to open said check valve, said check valve means communicating with first conduit means having an apertured portion communicating said second chamber with the interior of said conduit means, second conduit means extending into said first conduit means and terminating in a nozzle which terminates adjacent said apertured portion and which is directed to produce a stream of gas against said check valve means when said check valve means is open to assure maintenance of said check valve means in its open position, third conduit means carried by said valve member, said third conduit means being slidably mounted with respect to said second conduit means and communicating said first passageway with said second conduit means.

13. In a pressure activated valve structure of the character described, a diaphragm, a valve seat, a valve member on said diaphragm and cooperating with said valve seat, means including one side of said diaphragm and defining a first chamber, means including the other side of said diaphragm and one side of said valve member and defining a second chamber, means including the other side of said valve member and said seat and defining a third chamber, said first chamber being vented to the atmosphere, pressure operated pilot valve means normally closed to prevent communication of said second chamber with the atmosphere and operated to an open position in response to above atmosphere conditions in said second chamber to vent said second chamber to the atmosphere, and a passageway through said valve member communicating said third chamber with said second chamber, said passageway being directed to produce a gas flow against said pilot valve means to develop a force thereon acting in a direction to open said pilot valve means, said passageway including first conduit means on said valve member, second conduit means in communication with the first conduit and slidably mounted with respect thereto for guiding movement for said diaphragm, said second conduit means including nozzle means for directing a stream against said pilot valve means when opened to assure maintenance of said check valve means in its open position, an apertured portion in said second conduit means adjacent said nozzle means and communicating said second chamber with said second conduit means.

14. In a pressure relief system of the character described wherein a pallet assembly is positioned with respect to a valve seat in accordance with pressure conditions on opposite sides of a diaphragm supporting said assembly, and with one of said sides being subjected to atmospheric pressure and with the other one of said sides together with one side of said assembly defining a chamber, and with the other side of said assembly being subjected to a tank pressure, the improvement which resides in providing: pilot means for closing said chamber; conduit means extending through said assembly and communicating said tank pressure to said chamber; said pilot valve means being pressure responsive and set to open at a preset pressure in said chamber insufficient to move said assembly from its seat; and said conduit means being directed to produce a stream against said pilot valve means to tend to maintain said pilot valve means open once it is opened by said preset pressure, said assembly including a normally closed valve element which is automatically opened in response to subatmospheric conditions in said chamber.

References Cited by the Examiner
UNITED STATES PATENTS

| | | | |
|---|---|---|---|
| 2,224,394 | 12/1940 | Jurs | 137—491 |
| 2,890,714 | 6/1959 | Greenwood et al. | 137—491 X |
| 3,075,544 | 1/1963 | Heideman | 137—489 X |
| 3,100,503 | 8/1963 | Tennis | 137—491 |
| 3,189,675 | 6/1965 | Moore et al. | 251—65 X |

M. CARY NELSON, *Primary Examiner.*

MARTIN P. SCHWADRON, *Examiner.*

R. J. MILLER, *Assistant Examiner.*